US010038358B2

(12) United States Patent
Murphy et al.

(10) Patent No.: US 10,038,358 B2
(45) Date of Patent: Jul. 31, 2018

(54) WIRE FORMING APPARATUS FOR ELECTRIC MACHINE WINDING

(71) Applicant: Remy Technologies LLC, Pendleton, IN (US)

(72) Inventors: James Paul Murphy, Fishers, IN (US); Kirk Neet, Pendleton, IN (US)

(73) Assignee: BorgWarner Inc., Auburn Hills, MI (US)

( * ) Notice: Subject to any disclaimer, the term of this patent is extended or adjusted under 35 U.S.C. 154(b) by 365 days.

(21) Appl. No.: 14/834,734

(22) Filed: Aug. 25, 2015

(65) Prior Publication Data

US 2016/0052041 A1 Feb. 25, 2016

Related U.S. Application Data

(60) Provisional application No. 62/041,419, filed on Aug. 25, 2014.

(51) Int. Cl.
*B21F 35/04* (2006.01)
*H02K 15/04* (2006.01)

(52) U.S. Cl.
CPC ......... *H02K 15/0421* (2013.01); *B21F 35/04* (2013.01)

(58) Field of Classification Search
CPC ......... H02K 15/0421; B21F 1/00; B21F 1/04; B21F 35/04; B21D 11/00; B21D 11/07
USPC .......................................................... 72/383
See application file for complete search history.

(56) References Cited

U.S. PATENT DOCUMENTS

| 382,426 | A | * | 5/1888 | Howe | B21D 11/18 |
| | | | | | 72/383 |
| 3,722,254 | A | * | 3/1973 | Katogir | B21D 11/07 |
| | | | | | 72/383 |
| 7,624,768 | B2 | | 12/2009 | Neet et al. | |
| 2011/0174041 | A1 | | 7/2011 | Caudill et al. | |

FOREIGN PATENT DOCUMENTS

| EP | 1034861 A2 | | 9/2000 |
| JP | 63149022 A | * | 6/1988 |
| JP | H06185744 A | | 7/1994 |
| JP | 2010166799 A | | 7/2010 |

OTHER PUBLICATIONS

Machine translation of JP 63-149022A, Hishida et al., pp. 1-4, translated on Nov. 19, 2017.*

* cited by examiner

*Primary Examiner* — Teresa M Ekiert
(74) *Attorney, Agent, or Firm* — Maginot, Moore & Beck LLP (57) ABSTRACT

A wire forming apparatus comprises a first rack moveable relative to a second rack in a first direction. Multiple forming structures are provided on the first rack and the second rack. The plurality of forming structures include a first plurality of forming structures configured to move relative to the first rack in a second direction, and a second plurality of forming structures configured to move relative to the second rack in the second direction. A plurality of are actuators are configured to move the first rack relative to the second rack, move the first plurality of forming structures relative to first rack, and move the second plurality of forming structures relative to the second rack.

23 Claims, 6 Drawing Sheets

FIG. 10

WIRE FORMING APPARATUS FOR ELECTRIC MACHINE WINDING

CROSS-REFERENCE TO RELATED APPLICATIONS

This application claims the benefit of U.S. Provisional Patent Application No. 62/041,419, filed Aug. 25, 2014, the contents of which are incorporated herein by reference.

FIELD

This application relates to the field of apparatus for forming a wire, and more particularly to an apparatus for forming wire segments for use in the windings of a dynamo-electric machine.

BACKGROUND

The arrangement of copper wire in the slots of a stator core of a dynamoelectric machine often involves forming or shaping of the wire before the wire is inserted into stator slots. Typically, the wire is formed to include a plurality of coil segments. These coil segments are commonly formed in the wire via a rotating, barrel type device, onto which unformed wire is fed. The rotating device generally includes a plurality of forming protrusions that contact the wire to form the coil segments. The coil segments are formed one-at-a-time over the protrusions, as the wire is rotated/fed onto the rotating device.

One drawback to forming coil segments one-at-a-time is the amount of time the process takes compared to a process wherein a plurality of coil segments are formed simultaneously. Accordingly, various apparatus and methods have been utilized in the past for simultaneously forming a plurality of coil segments. One example of a prior art apparatus for simultaneously forming a plurality of coil segments is found in U.S. Pat. No. 7,624,768, the contents of which are incorporated herein by reference in their entirety.

According to the disclosure of U.S. Pat. No. 7,624,768, an apparatus is configured to simultaneously form a plurality of coil segments in a copper wire. The apparatus includes a plurality of forming structures coupled to an on-axis actuator. Activation of the on-axis actuator draws the forming structures toward one another in the on-axis direction. At the same time, alternating forming structures are moved away from one another in the off-axis direction. As a result, a wire is bent into a desired shape (e.g., upper and lower coil segments, each coil segment having an end-loop shape).

While the arrangement of U.S. Pat. No. 7,624,768 allows for the simultaneous formation of a plurality of coil segments there are a few issues. For example, it may be relatively difficult for a human or a machine to remove the formed wire from the apparatus. This is due, in part, to the limitations in separate movement of the forming structures in the on-axis and off-axis directions following formation of the wire segments. Another exemplary issue with the arrangement of U.S. Pat. No. 7,624,768 is that the apparatus includes numerous components with multiple parts, including clamping actuators with springs, and failure of any one of these components will result in the need for machine down-time to allow for repairs.

In view of the foregoing, it would be advantageous to provide a wire forming apparatus wherein the formed wire segments may be more quickly and easily removed from the apparatus. It would also be advantageous if such an apparatus was comprised of relatively few parts and was reliable in operation. Moreover, it would be advantageous if such a wire forming apparatus could be more easily and economically constructed than various wire forming apparatus found in the prior art.

SUMMARY

In accordance with one embodiment of the disclosure, there is provided a wire forming apparatus. The wire forming apparatus comprises a first rack moveable relative to a second rack in a first direction. A plurality of forming structures is provided on the first rack and the second rack. The plurality of forming structures include a first plurality of forming structures configured to move relative to the first rack in a second direction, and a second plurality of forming structures configured to move relative to the second rack in the second direction. A plurality of actuators are configured to (i) move the first rack relative to the second rack, (ii) move the first plurality of forming structures relative to first rack and into closer proximity, and (iii) move the second plurality of forming structures relative to the second rack and into closer proximity.

In another embodiment of the disclosure, a wire forming apparatus includes a plurality of forming structures provided on a first rack and a second rack. The plurality of forming structures include a first plurality of forming structures configured to move along a first axis and a second plurality of forming structures configured to move along a second axis that is parallel to the first axis. The first plurality of forming structures are connected by a first on-axis gate structure, and the second plurality of forming structures are connected by a second on-axis gate structure. Actuators are provided on the apparatus and are configured to move the gate structures between an expanded position and a collapsed position.

In yet another embodiment of the disclosure, a wire forming apparatus comprises a first rack moveable relative to a second rack in a first direction. A plurality of forming structures is provided on the first rack and the second rack. The plurality of forming structures including a first plurality of forming structures configured to move relative to the first rack in a second direction, and a second plurality of forming structures configured to move relative to the second rack in the second direction. The first plurality of forming structures interleaved with the second plurality of forming structures.

In still another embodiment of the disclosure, there is provided a method of forming a winding segment. The method comprises inserting a straight wire into a plurality of forming structures including a first plurality of forming structures coupled to a first rack and a second plurality of forming structures coupled to a second rack. The method further comprises forming the straight wire by (i) moving the first rack away from the second rack, (ii) moving the first plurality of forming structures closer together, and (iii) moving the second plurality of forming structures closer together. Thereafter, the formed wire is removed from the plurality of forming structures.

The above described features and advantages, as well as others, will become more readily apparent to those of ordinary skill in the art by reference to the following detailed description and accompanying drawings. While it would be desirable to provide a wire forming apparatus for electric machine windings that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
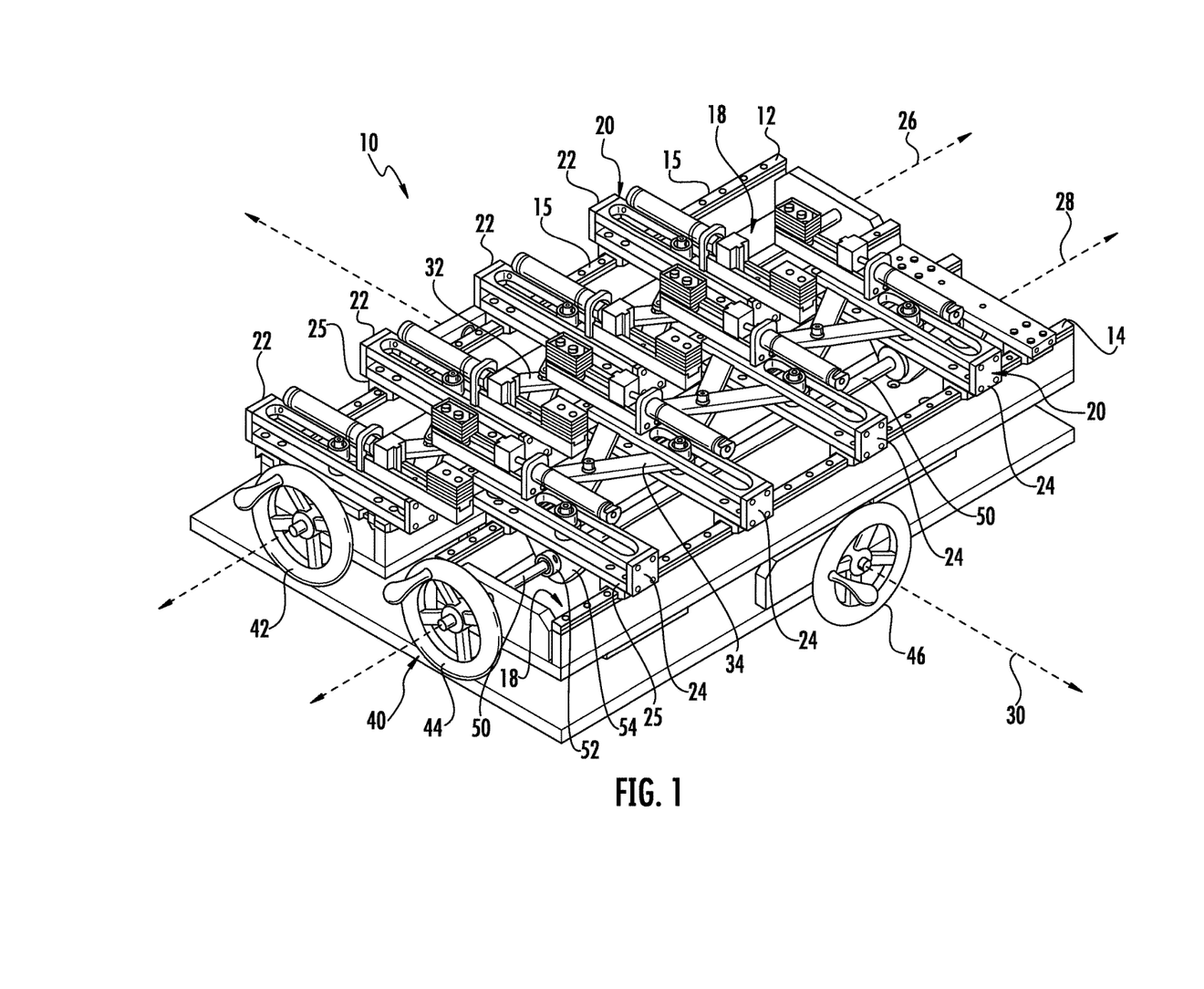
FIG. 1 shows a perspective view of a wire forming apparatus for an electric machine including forming structures configured to move along two parallel axis.
Figure 2:
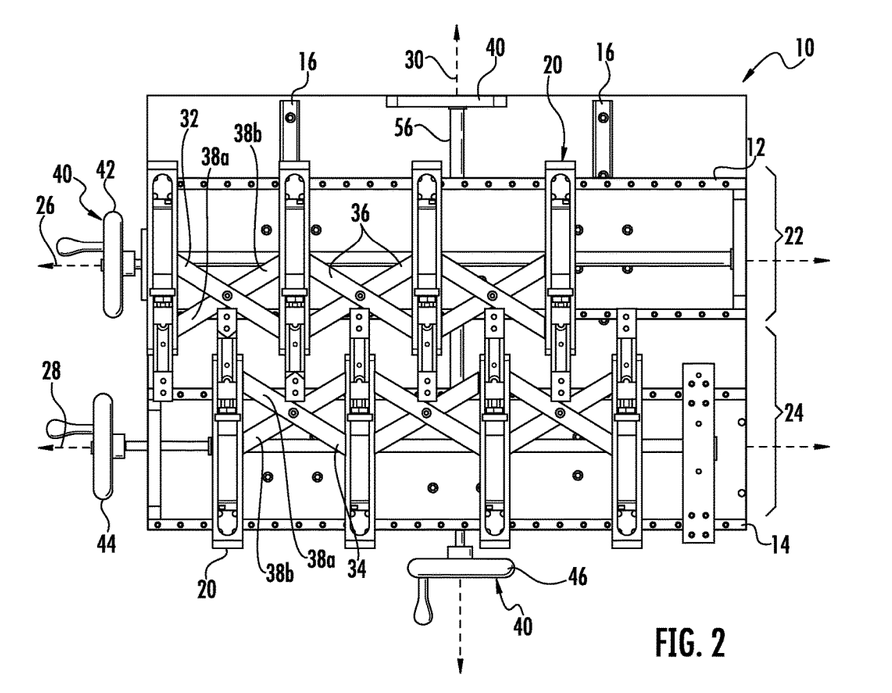
FIG. 2 shows a plan view of the wire forming apparatus of FIG. 1.

With reference to the embodiment of FIGS. 1 and 2, a wire forming apparatus 10 is shown. The wire forming apparatus includes a plurality of forming structures 20 provided on a first rack 12 and a second rack 14. The plurality of forming structures 20 include a first plurality of forming structures 22 configured to move along a first axis 26 and a second plurality of forming structures 24 configured to move along a second axis 28 that is parallel to the first axis 26. The first plurality of forming structures 22 are interleaved with and offset from the second plurality of forming structures 24. The first plurality of forming structures 22 are connected by a first on-axis gate structure 32 (which may also be referred to herein as a first scissor gate 32), and the second plurality of forming structures 24 are connected by a second on-axis gate structure 34 (which may also be referred to herein as a second scissor gate 34). The gate structures 32 and 34 are adjustable, and actuators 40 are provided on the apparatus which are configured to move the gate structures 32 and 34 between an expanded position and a collapsed position.

The first rack 12 and the second rack 14 are generally structures that support the forming structures 20, with the first rack supporting the first forming structures 22 and the second rack supporting the second forming structures 24. In the embodiment of FIGS. 1 and 2, the first rack 12 and the second rack 14 are provided as rectangular boxes and the forming structures 20 are arranged upon rails 15 provided along the edges of the boxes. Each of the forming structures 20 includes two sliders 25 that engage the rails 15 of the associated rack 12 or 14 in a tongue-and-groove-like manner. A first slider on each forming structure 20 engages a rail 15 on one side of the rack, and a second slider on the forming structure 20 engages a rail 15 on an opposite side of the rack. The two opposing rails 15 and sliders 25 allow each forming structure 20 to slide along the rails 15 in the direction of the respective axes 26 or 28.

A drive mechanism is provided in order to drive movement of the forming structures 20 along the rails 15 of the associated rack 12 or 14. In the embodiment of FIGS. 1-2, the drive mechanism is provided by a rotatable threaded shaft 50, an associated rider 52, and the gate structures 32, 34. A cavity 18 is formed in each box of the first rack 12 and the second rack 14, and the rotatable threaded shaft 50 extends through the cavity 18. The threaded rider 52 is positioned on the shaft 50 such that rotation of the shaft 50 moves the rider 52 in the on-axis direction along of one of axis 26 or 28. The rider 52 is coupled to one or more of the forming structures 20 (e.g., the forming structures closest to the ends of the box) by a bracket 54. Accordingly, movement of the rider 52 also results in movement of the associated bracket 54 and forming structure 20. Because the first forming structures 22 are connected by gate structure 32, movement of one first forming structure 22 results in movement of the other first forming structures 22. Similarly, because the second forming structures 24 are connected by gate structure 34, movement of one second forming structure 24 results in movement of the other second forming structures 24.

In the embodiment of FIGS. 1-2, the first rack 12 and the second rack are mounted on a deck 11 of the wire forming apparatus 10. The second rack 14 is stationary relative to a deck 11, and the first rack 12 is moveable relative to the deck 11. The first rack 12 is configured to move in an off-axis direction defined by axis 30, which axis 30 is perpendicular to the on-axis direction defined by axes 26 and 28. The first rack 12 is configured to move upon tracks 16 positioned under the first rack 12. To this end, another threaded shaft 56 extends in the off-axis direction through another rider (not shown) that is below and coupled to the first rack 12. Rotation of the threaded shaft 56 moves the rider and connected first rack 12 in the off-axis direction, as indicated by axis 30. Rotation of the threaded shaft 56 may also move the both the first rack 12 and second rack 14 either towards/away from each other in the off-axis direction, as indicated by axis 30. While an exemplary drive arrangement is disclosed herein for movement of the racks 12 and 14 and forming structures, it will be recognized that alternative embodiments are also contemplated. Accordingly, different power systems, gearing mechanisms, and other mechanical arrangements may be used to move the rack 12 and the forming structures 20, such as a rack and pinion-type arrangement or any of various other suitable arrangements.

As shown in FIGS. 1 and 2, the first forming structures 22 are oriented on the first rack 12 in an opposite direction from the second forming structures 24 on the second rack 14. In addition, the first forming structures 22 are interleaved with and offset from the second forming structures 24. The offset between the forming structures 20 results in a staggered arrangement for the forming structures on the wire forming apparatus 10. While the first forming structures 22 move along axis 26, and the second forming structures 24 move along axis 28, the first forming structures 22 remain staggered and interleaved with the second forming structures 24.

Figure 3:
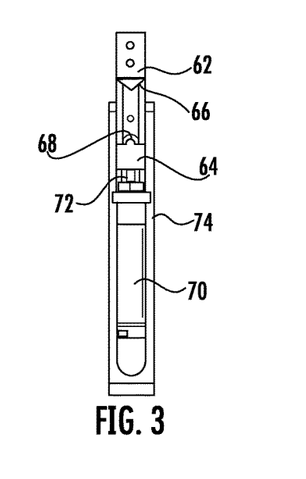
FIG. 3 shows an enlarged plan view of one of the forming structures for the wire forming apparatus of FIG. 2.
Figure 4:
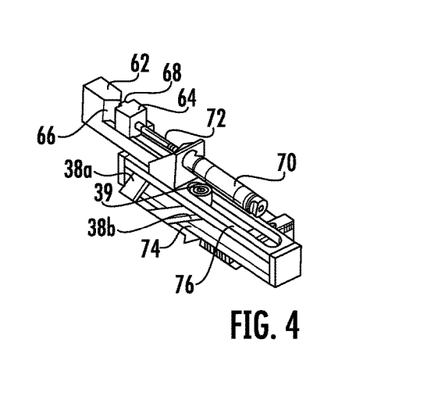
FIG. 4 shows a perspective view of the forming structure of FIG. 3.

With reference now to FIGS. 3 and 4, an isolated view of each forming structure 20 is shown. Each forming structure 20 includes a first wire-engaging surface provided 66 by a first clamping member 62 and may also include a second wire-engaging surface 68 provided by a second clamping member 64. While both a first clamping member 62 and a second clamping member 64 have been disclosed in the embodiments herein, it will be recognized that in other embodiments, other arrangements are possible. For example, only a single clamping member (e.g., 62) or a single wire-engaging surface may be provided on a forming structure.

In the embodiment of FIGS. 1-4, the first clamping member 62 is generally stationary on the forming structure, and the second clamping member 64 is configured to move in the off-axis direction. In at least one embodiment, the wire engaging surface 66 of the first clamping member 62 is a first convex surface and the wire engaging surface 68 of the second clamping member 64 is a second convex surface (in the disclosed embodiment of FIGS. 1-4, the second clamping member 64 is relatively flat with a small knob on a tip portion which provides a generally convex wire engaging surface). In the embodiment of FIGS. 1-4, the wire engaging surfaces 66 and 68 face one another. However, it will be recognized that in other embodiments, the clamping members and wire engaging surfaces may be arranged differently. For example, in the at least one embodiment wherein only a single wire engaging surface is associated with the forming structure 20, the wire engaging surface (e.g., surface 68) may be convex in shape and face away from the remaining components of the forming structure 20.

Each forming structure 20 further includes an actuator configured to move the second clamping member 64 relative to the first clamping member 62. In the embodiment of FIGS. 1-4 the actuator is a pneumatic cylinder 70 with a rod 72 that is connected to the second clamping member 64. Alternatively, a larger cylinder (not shown) may be connected to all of the forming structures 20. Furthermore, if only a single wire-engaging surface is used (e.g., member 62), the tension in the to-be-formed wire may be enough to achieve the desired wire retaining force, and therefore the second clamping members 64 may not be required.

Figure 7:
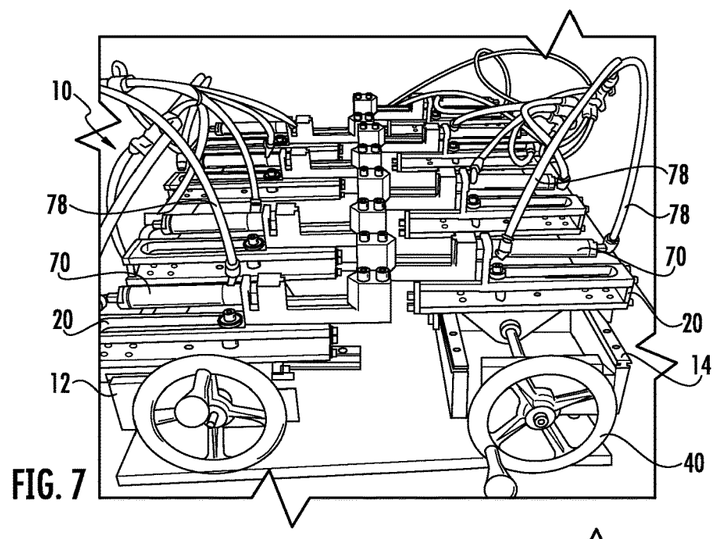
FIG. 7 shows a perspective view of the wire forming apparatus of FIG. 1 with air tubes coupled to pneumatic cylinders of the forming structures.

Each pneumatic cylinder 70 is connected to two air tubes 78 as shown in FIG. 7. A first air tube is configured to deliver pressurized air to a first end of the pneumatic cylinder 70, and a second air tube is configured to deliver pressurized air to a second end of the pneumatic cylinder. When pressurized air is delivered through the first tube, the second clamping member 64 is forced toward the first clamping member 62. When pressurized air is released from the first tube and delivered to the second tube, the second clamping member 64 is force away from the first clamping member 62.

The first and second clamping members 62, 64 and the pneumatic cylinder 70, are each mounted on a base portion 74 of the forming structure 20. The base portion 74 is generally box-shaped. The bottom of the base portion 74 is connected to two of the sliders 25. The top of the base portion includes a slot 76 that is arranged below the pneumatic cylinder. Each slot 76 receives an end 38 of a leg 36 of one of the scissor gates 32, 34 and is therefore coupled to the scissor gate. As explained in further detail below, when the scissor gates 32, 34 expand and contract, the forming structures 20 are moved in an axial direction along either axis 26 or 28.

With continued reference to FIGS. 1-4, each of the scissor gates 32, 34 includes a plurality of legs 36 that are pivotably joined together at their ends and at center locations. In the embodiment of FIGS. 1 and 2, the legs 36 are formed as a plurality of leg-pairs that form X-shaped members. Accordingly, the legs 36 of each leg-pair criss-cross each other and are pivotably joined at a center pivot location. The leg ends 38 of each X-shaped leg-pair are pivotably joined to the leg ends of another X-shaped leg pair. Furthermore, each leg end 38 is also pivotably joined to the base portion 74 of one of the forming structures 20. The centrally located leg ends 38a (i.e., those leg ends closest to an opposing rack 12, 14) are pivotably connected to the associated base portion 74, but are not slideable on the base portion 74. However, the more distal leg ends 38b are both pivotably and slideably mounted on the base portion. In particular, each leg end 38b includes a grooved wheel 39, bracket, or other carrier that allows the leg end 38b to slide or otherwise move within the slot 76 of the associated base portion 74. Because the forming structures 20 are coupled to the scissor gates 32, 34, the forming structures 20 are moved in an axial direction along either axis 26 or 28 as the scissor gates 32, 34 are opened (i.e., expanded) and closed (i.e., contracted). However, one of the forming structures 20 is typically fixed upon the associated rack. For example, in FIG. 2, the left-most end of the scissor gate 32 closest to the actuator 40 as fixed upon the first rack 12. When the scissor gates 32, 34 are closed, all of the legs 36 and therefore the forming structures 20 will move into closer proximity toward the fixed forming structure closest to the end of the rack. Alternatively, a forming structure 20 at a position near the center (or any of various other positions) of the scissor gates 32, 34 could be fixed to the associated rack, and then, when the scissor gates 32, 34 are closed, some of the legs 36 and forming structures 20 will move along the axis 26 or 28 to the left and some legs 36 and forming structures 20 will move to the right, with all of the forming structures moving into closer proximity. In both cases the legs 36 and other forming structures 20 will move toward the one forming structure having a fixed position.

In the embodiment of FIGS. 1 and 2, the actuators 40 are provided as crank actuators. The actuators 40 include a first on-axis actuator 42, a second on-axis actuator 44, and an off-axis actuator 46. The first on-axis actuator 42 is connected to the threaded shaft 50 that defines axis 26. The second on-axis actuator 44 is connected to the threaded shaft that defines axis 28. Cranking of the first on-axis actuator 42 results in rotation of the threaded shaft 50 in the first rack 12, movement of the first plurality of forming structures 22 in the on-axis direction along axis 26, and expansion or collapse of the scissor gate 32. Similarly, cranking of the second on-axis actuator 44 results in rotation of the threaded shaft 50 in the second rack 14, movement of the second plurality of forming structures 24 in the on-axis direction along axis 28, and expansion or collapse of the scissor gate 34. Other methods (not shown) and devices may be used to close or open the scissor gates 32, 34, such as but not limited to cylinders, motors, etc. Cranking of the off-axis actuator 46 results in rotation of the threaded shaft 56 and movement of the first rack 12 along the tracks 16 in the off-axis direction.

Figure 5:
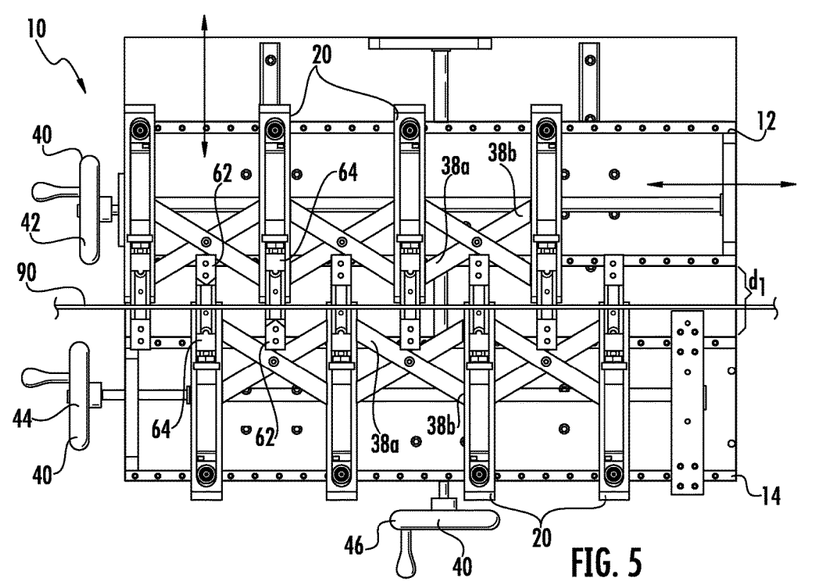
FIG. 5 shows the wire forming apparatus of FIG. 1 with the forming structures in an expanded position and a straight wire segment extending across the apparatus.

Operation of the wire forming apparatus 10 is now described with reference to FIGS. 5 and 6. As shown in FIG. 5, in order to form a winding segment, the clamping members are first opened (i.e., the first clamping member 62 is spaced apart from the second clamping member 64) on each of the plurality of forming structures. A length of wire 90 is then inserted into the wire forming apparatus such that the wire 90 extends between each of the opposing first clamping member 62 and second clamping member 64. If desired, more than one wire may be inserted into the wire forming apparatus at one time. If this is the case, the wires may be stacked upon each other in a direction that is perpendicular to both axis 26 and axis 30 (i.e., outward from the page in FIGS. 2 and 5).

With the wire 90 (or wires) in place on the wire forming apparatus 10, the pneumatic cylinders 70 are activated to close the clamping members (i.e., the first clamping member 62 is moved toward the second clamping member 64) on each forming structure 20 such that the wire is clamped in place. Then, the actuators 42 and 44 are activated to cause the threaded shaft 50 of both the first rack 12 and the second rack 14 to rotate. As a result, the riders 52 move along the threaded shaft, moving all but the fixed forming structure 20 in the axial direction along the associated axis 26 or 28 toward the fixed forming structure 20. This also causes all of the first forming structures 22 to move into closer proximity (i.e., the distance between each of the first forming structures is reduced), and all of the second forming structures 24 to move into closer proximity. At the same time, actuator 46 is activated to cause the first rack 12 to move away from the second rack 14. FIG. 5 shows that the distance between the first rack 12 and the second rack 14 is initially $d_1$. However, the distance between the first rack 12 and the second rack 14 eventually increases to a distance $d_2$ (i.e., $d_2 > d_1$) during the wire forming process, as shown in FIG. 6. As the scissor gates 32, 34 collapse, the first plurality of forming structures 22 are drawn closer together along axis 26 as a result of their connection to the first scissor gate 32, and the second plurality of forming structures 24 are drawn closer together along axis 28 as a result of their connection to the second scissor gate 34. As the forming structures 20 move, each central leg end 38a of the scissor gates 32, 34 pivots on the associated coupling to the base portion 74 of the forming structure 20. At the same time, the each distal leg end 38b of the scissor gates 32, 34 pivots and slides along the slot 76 of the associated base portion 74.

Figure 6:
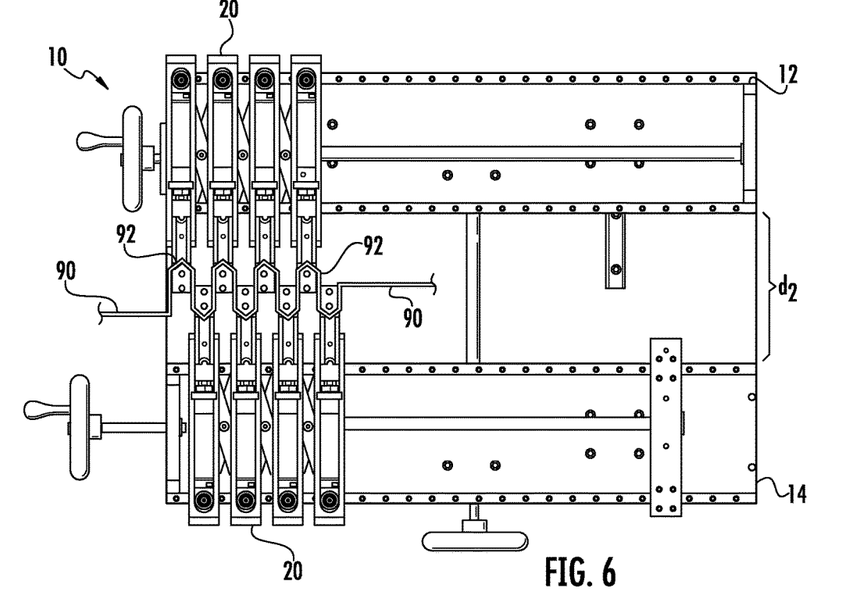
FIG. 6 shows the wire forming apparatus of FIG. 5 with the wire segment in a collapsed position and the wire segment bent into a winding segment.

FIG. 5 shows the scissor gates 32, 34 in an expanded (fully open) position, and FIG. 6 shows the scissor gates 32, 34 in the contracted (fully closed position). As noted above, this movement of the scissor gates 32, 34 causes the forming structures 20 to also move, and thus the wire 90 to which the forming structures are clamped is folded or bent as the forming structures 20 move. As a result of this movement of the forming structures 20, the wire 90 is bent into a desired winding segment 92 shape as shown in FIG. 6. This bent wire winding segment 92 is properly configured for insertion into a stator of an electric machine.

Figure 8:
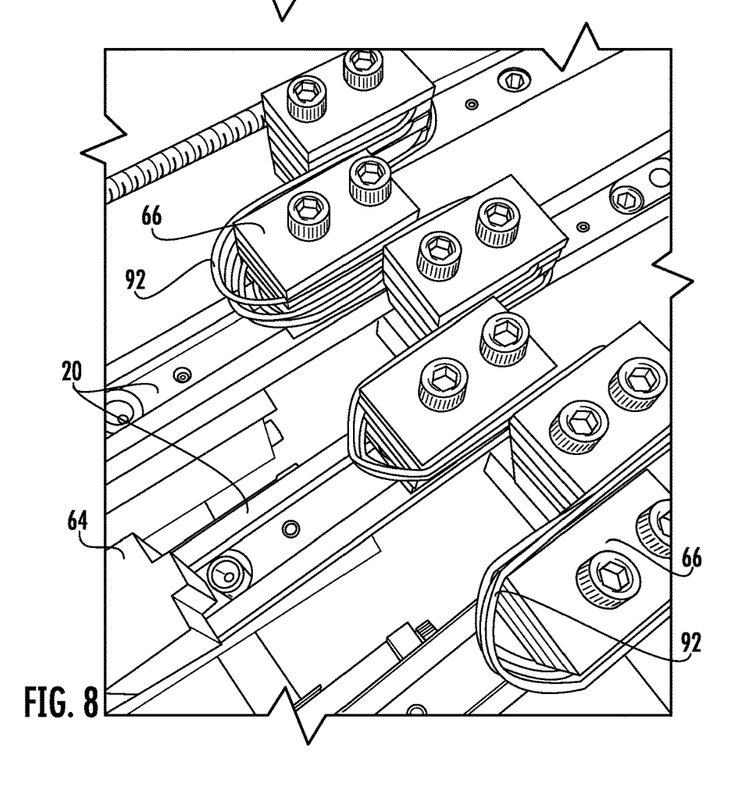
FIG. 8 shows an enlarged view of the wire forming apparatus of FIG. 6 showing the exposed winding segment when the forming structures are opened for removal of the winding segment from the wire forming apparatus.

After the wire 90 is bent into the desired shape for the winding segment 92, the winding segment 92 must be removed from the forming structures 20. Accordingly, air is delivered through the tubes 78 to the pneumatic cylinders to reverse the bias direction of the pneumatic cylinders, thus causing the second clamping members 64 to move away from the first clamping members 62 on the forming structures. Thereafter or at the same time, the first rack 12 can be moved slightly towards the second rack 14 such that the first forming structures 22 are moved slightly toward the second forming structures 24 in the off-axis direction. With the second clamping members 64 removed from the first clamping members 62 and the first rack 12 moved slightly towards the second rack 14 (i.e., the first forming structures 22 moved slightly toward the second forming structures 24 in the off-axis direction), the winding segment 92 is exposed as shown in FIG. 8, and a human hand or robot (e.g., pick-and-place device) is provided with access to the winding segment 92. This allows the winding segment 92 to be easily removed from the wire forming apparatus 10.

While an exemplary operation of the wire forming apparatus 10 of the arrangement of FIGS. 1-4 is described above, it will be recognized that other operations may be involved with alternative embodiments of the wire forming apparatus. For example, in at least one embodiment, the actuator 46 is activated to cause the first rack 12 to move towards the second rack 14 in order to bend the wire in the desired shape (rather than moving the first rack 12 away from the second rack 14 as described above). While such embodiments may require slight modifications to the wire forming structures 20 and/or gate structures 32, 34, it will be appreciated that such alternative embodiments are possible and contemplated.

Figure 9:
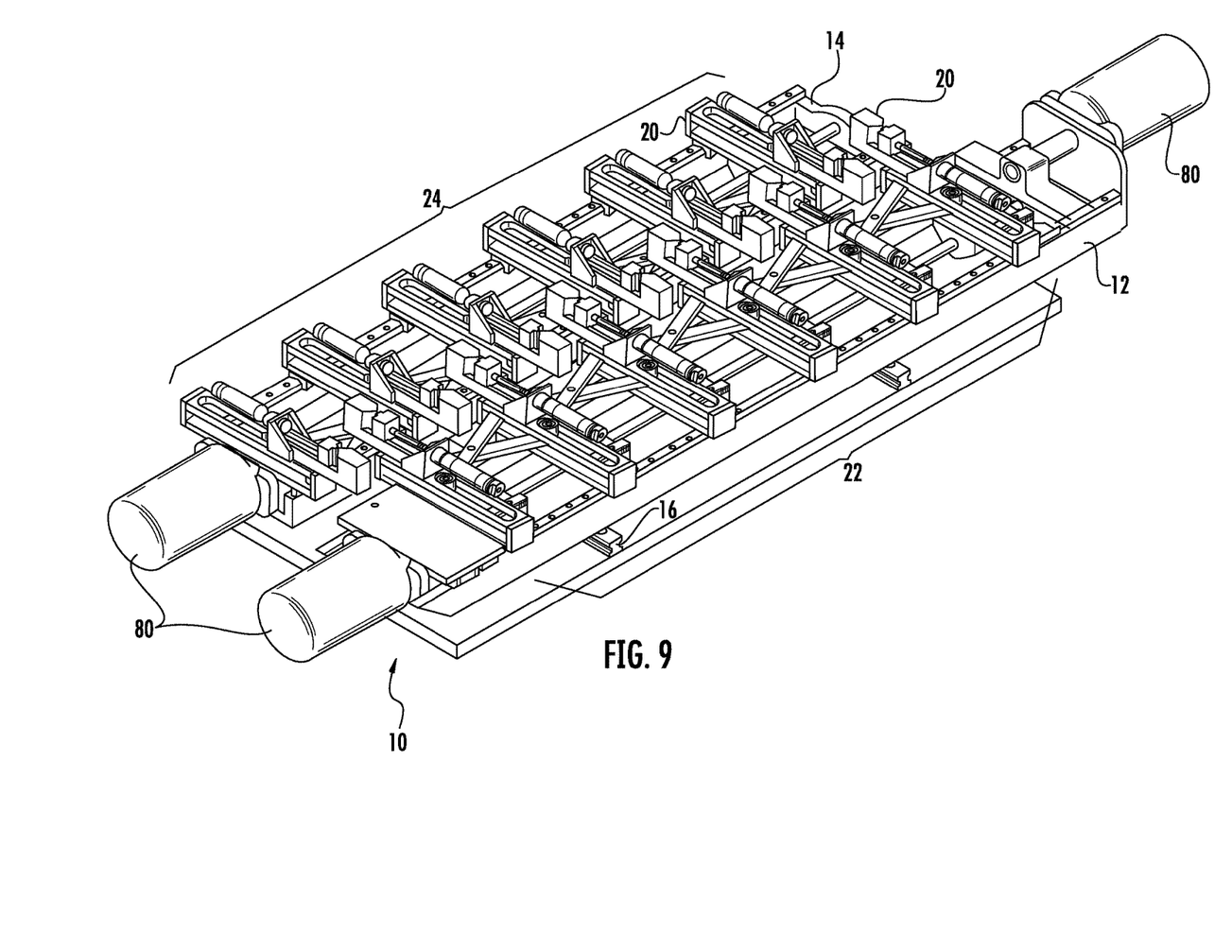
FIG. 9 shows an alternative embodiment of the wire forming apparatus of FIG. 1 in the expanded position and the crank actuators replaced by servo-motor actuators.
Figure 10:
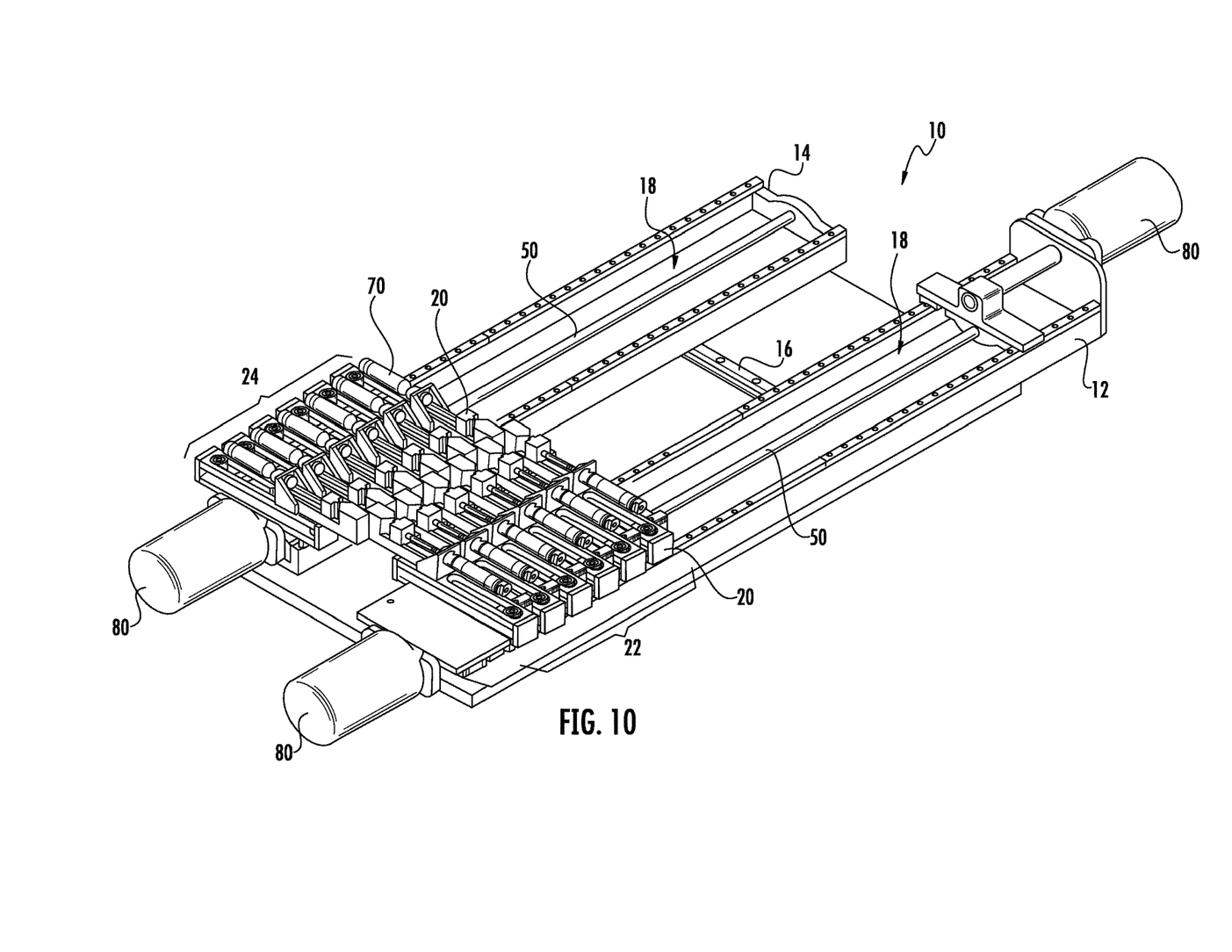
FIG. 10 shows the alternative embodiment of the wire forming apparatus of FIG. 9 with the wire forming apparatus in the collapsed position.

With reference to FIGS. 9 and 10, in at least one alternative embodiment, the actuators 20 are servo-motors 80 instead of crank-type actuators. In this arrangement, movement of the first rack 12 and the forming structures 20 is accomplished electronically by the servo motors which are controlled by a common controller.

It will be recognized that the wire forming apparatus disclosed herein is structurally distinct from prior art wire forming devices. For example, in the present disclosure there are two distinct scissor gates 32, 34 (i.e., two "on-axis actuators"). When the wire forming apparatus 10 is collapsed, the forming structures 20 are moved closer together in the on-axis direction (i.e., along axis 26 or 28), and the racks 12 and 14 are moved apart in the off-axis direction (i.e., along axis 30). This results in a folding of the conductor wire in a desired shape. When the wire forming apparatus 10 is expanded, the forming structures 20 are moved further apart in the on-axis direction, and the racks 12 and 14 are moved closer together in the off-axis direction. Because there are two racks 12 and 14, the wire may be more easily removed after it is formed into the desired shape.

Movement in the on-axis direction may be facilitated by two crank mechanisms as shown in FIG. 1 or two servo motors as shown in FIGS. 9 and 10. Similarly, movement in the off-axis direction may be facilitated by a crank mechanism as shown in FIG. 1 or a servo motor as shown in FIGS. 9 and 10. In the embodiment of FIGS. 9 and 10, the servo motor controlling the on-axis direction movement and the servo-motor controlling the off-axis direction movement are electrically tied together so that the racks 12, 14 and the scissor gates 32, 34 move the appropriate distance to form the desired winding segment 92. In particular, the servo motors are configured to move the scissor gates 32, 34 such that a length of wire is folded from the straight linear shape to the desired zig-zag shape.

As discussed above, the use of two scissor gates allows for the wire segment to be easily removed from the apparatus after it is formed. After forming the wire segment, the pneumatic cylinders drive the second clamping members 64 away from the first clamping members 62, removing the formed wire from any clamping arrangement. Also, the off-axis actuator 46 drives the first rack 12 in reverse of the off-axis direction such that the first rack 12 moves toward the second rack 14. However, the on-axis actuators 42 and 44 remain stationary, leaving the forming structures 20 in close proximity in the on-axis direction such that the newly formed wire is not disturbed. Thus, the newly contoured wire (or wires) is exposed along the first clamping members 64, as shown in FIG. 8. The wire segment 92 therefore becomes accessible which enables a human or robot to easily remove the formed wire segment from the apparatus 10.

The foregoing detailed description of one or more embodiments of the wire forming apparatus for electric machine windings has been presented herein by way of example only and not limitation. It will be recognized that there are advantages to certain individual features and functions described herein that may be obtained without incorporating other features and functions described herein.

Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by any appended claims. Therefore, the spirit and scope of any appended claims should not be limited to the description of the embodiments contained herein.

What is claimed is:

1. A wire forming apparatus comprising:
   a first rack moveable relative to a second rack in a first direction;
   a first plurality of forming structures provided on the first rack and a second plurality of forming structures provided on the second rack, the first plurality of forming structures configured to move closer together on the first rack in a second direction, and the second plurality of forming structures configured to move closer together on the second rack in the second direction; and
   a plurality of actuators configured to (i) move the first rack relative to the second rack, (ii) move-the first plurality of forming structures closer together on the first rack, and (iii) move the second plurality of forming structures closer together on the second rack, wherein the plurality of actuators are servomotors.

2. The wire forming apparatus of claim 1 wherein the first direction is perpendicular to the second direction.

3. The wire forming apparatus of claim 2 further comprising a first gate structure connecting the first plurality of forming structures on the first rack and a second gate structure connecting the second plurality of forming structures on the second rack.

4. The wire forming apparatus of claim 3 wherein the first gate structure and the second gate structure are scissor gates.

5. The wire forming apparatus of claim 1 wherein the plurality of forming structures include a second clamping member moveable relative to a first clamping member.

6. The wire forming apparatus of claim 1 wherein the first rack and the second rack include rails, wherein the first plurality of forming structures are configured to slide in the second direction upon the rails of the first rack, and wherein the second plurality of forming structures are configured to slide in the second direction upon the rails of the second rack.

7. The wire forming apparatus of claim 1 further comprising a deck, the first rack and the second rack mounted upon the deck, wherein the first rack is moveable relative to the deck and the second rack is stationary relative to the deck.

8. A wire forming apparatus comprising:
   a first rack moveable relative to a second rack in a first direction;
   a first plurality of forming structures provided on the first rack and a second plurality of forming structures provided on the second rack, the first plurality of forming structures configured to move closer together on the first rack in a second direction, and the second plurality of forming structures configured to move closer together on the second rack in the second direction wherein the first plurality of forming structures are interleaved with the second plurality of forming structures when the first plurality of forming structures and the second plurality of forming structures are moved closer together; and
   a plurality of actuators configured to (i) move the first rack relative to the second rack, (ii) move-the first plurality of forming structures into closer proximity on the first rack, and (iii) move the second plurality of forming structures into closer proximity on the second rack.

9. The wire forming apparatus of claim 8 wherein the first direction is perpendicular to the second direction, and further comprising a first gate structure connecting the first plurality of forming structures on the first rack and a second gate structure connecting the second plurality of forming structures on the second rack.

10. The wire forming apparatus of claim 9 wherein the first gate structure and the second gate structure are scissor gates.

11. The wire forming apparatus of claim 8 wherein the wire forming apparatus is configured to form a wire into a desired zig-zag shape.

12. The wire forming apparatus of claim 8 wherein the wire forming apparatus is configured to fold a wire into a zig-zag shape.

13. A wire forming apparatus comprising:
    a first rack moveable relative to a second rack in a first direction; and
    a first plurality of forming structures provided on the first rack and a second plurality of forming structures provided on the second rack, the first plurality of forming structures configured to move into closer proximity on the first rack in a second direction such that a distance between each adjacent of the first plurality forming structures is reduced, and the second plurality of forming structures configured to move into closer proximity on the second rack in the second direction such that a distance between each adjacent of the second plurality of forming structures is reduced, the first plurality of forming structures interleaved with the second plurality of forming structures;
    a first actuator configured to move the first rack relative to the second rack;
    a second actuator configured to move the first plurality of forming structures into closer proximity on the first rack; and
    a third actuator configured to move the second plurality of forming structures into closer proximity on the second rack.

14. The wire forming apparatus of claim 13 wherein the first direction is perpendicular to the second direction.

15. The wire forming apparatus of claim 14 further comprising a first gate structure connecting the first plurality of forming structures on the first rack and a second gate structure connecting the second plurality of forming structures on the second rack.

16. The wire forming apparatus of claim 15 wherein the first gate structure and the second gate structure are adjustable gates.

17. The wire forming apparatus of claim 13 wherein the plurality of forming structures include a second clamping member moveable relative to a first clamping member.

18. The wire forming apparatus of claim 17 further comprising a pneumatic actuator configured to move the second clamping member relative to the first clamping member.

19. The wire forming apparatus of claim 13 wherein the first rack and the second rack include rails, wherein the first plurality of forming structures are configured to slide in the second direction upon the rails of the first rack, and wherein the second plurality of clamping structures are configured to slide in the second direction upon the rails of the second rack.

20. The wire forming apparatus of claim 13 further comprising a deck, the first rack and the second rack mounted upon the deck, wherein the first rack is moveable relative to the deck and the second rack is stationary relative to the deck.

21. A method of forming a winding segment comprising
inserting a wire into a plurality of forming structures including a first plurality of forming structures coupled to a first rack and a second plurality of forming structures coupled to a second rack;
moving one of the first rack and the second rack in a first off-axis direction;
simultaneously with moving one of the first rack and the second rack in the first off-axis direction, moving the first plurality of forming structures closer together in an on-axis direction and moving the second plurality of forming structures closer together in the on-axis direction such that the first plurality of forming structures are interleaved with the second plurality of forming structures;
moving one of the first rack and second rack in a second off-axis direction; and
removing the wire from the plurality of forming structures.

22. The method of claim 21 wherein the second off-axis direction is opposite the first off-axis direction.

23. The method of claim 21 wherein the first off-axis direction is substantially perpendicular to the on-axis direction.

* * * * *